Patented Nov. 20, 1945

2,389,347

UNITED STATES PATENT OFFICE 2,389,347

MANUFACTURE OF POLYHYDRIC ALCOHOLS

Henry Dreyfus, London, England, assignor to Celanese Corporation of America, a corporation of Delaware No Drawing. Application April 19, 1941, Serial No. 389,418. In Great Britain April 3, 1940

7 Claims. (Cl. 260—635)

This invention relates to the manufacture of organic compounds and, more particularly, glycols and other polyhydric alcohols.

According to the invention a hydroxyl-group-containing halogen derivative of a polyhydric alcohol is subjected to the action of heat in presence of copper or silver in a finely divided and chemically reactive form, so as to eliminate halogen from said compound to produce a polyhydric alcohol of higher molecular weight.

The term "polyhydric alcohol" includes within its scope the glycols and a most important embodiment of the invention is the treatment of glycol halo-hydrins and, in particular, the chlorhydrins and bromhydrins, for instance of the ethylene, trimethylene and propylene glycols. From these starting materials other glycols of higher molecular weight are obtained by the process of the invention. For example, from ethylene glycol chlorhydrin there is obtained 1:4-butylene glycol. The invention includes also the treatment of hydroxyl-group-containing halogen derivatives of glycerol and other polyhydric alcohols and especially the monochlor derivatives thereof, e. g. glycerol alpha-monochlorhydrin.

A chemical method may be used to produce the copper or silver in suitable form and reduction of a cuprammonium solution, acidified with acetic acid, by treatment with sulphur dioxide yields a copper which has been found effective. Other acids than acetic acid can be used for acidifying the cuprammonium solution, e. g. formic and propionic acids. The concentration of the solution affects the fineness of sub-division of the copper produced and it is preferred to use relatively dilute solutions, e. g. the cuprammonium solution may be prepared by adding aqueous ammonia of 0.880 specific gravity to a copper sulphate solution of 10–20% concentration, but better results are obtained if the copper sulphate solution is rather weaker than this, and preferably a solution of 5–10% concentration is used. Silver suitable for use in the process of the invention may be prepared in a similar manner, in this case the suspension of silver salt obtained by acidifying the ammoniacal silver solution being reduced with sulphur dioxide instead of a solution as in the case of copper. The copper or silver produced may be used while still moist with water used for washing or after drying by treatment with alcohol and then ether. Copper and silver prepared as described are chemically very active and should be stored out of contact with air in order to avoid oxidation.

It is desirable to use reaction temperatures above 100° C. e. g. temperatures of 125–175° C. or even higher, e. g. 200° C. With some starting materials and products, e. g. when making 1:4-butylene glycol from ethylene chlorhydrin, the reaction can be carried out by boiling the reaction mixture under reflux, vigorous boiling ensuring maintenance of the copper or silver in suspension. The reaction can be carried out under pressure, e. g. by heating the reactants in an autoclave especially when it is desired to employ a reaction temperature above the normal boiling point of the compounds used as starting material. Diluents may be employed and also assist in the maintenance of a higher reaction temperature than can conveniently be obtained by boiling the starting material. For instance, the vapour of the starting material may be circulated through a suspension of the copper or silver in a high boiling diluent.

It is not essential that the starting material should be absolutely anhydrous but it is desirable to avoid as far as possible the presence of water where such water is liable to cause hydrolysis of the halogen compound to produce the original glycol. A suitable starting material for use in producing 1:4-butylene glycol can be obtained by distilling an aqueous solution of ethylene chlorhydrin to obtain a solution of high concentration and thereafter extracting the chlorhydrin with a solvent of hydrophobe qualities, for instance benzol, subsequently separating the substantially anhydrous chlorhydrin thus obtained from the benzol or other solvent by distillation.

The period during which the reactants are heated together may be varied according to the reactivity of the starting materials and according to the conversion desired, since it is sometimes more economical to separate the products at a given stage than to continue the process for a much longer period in order to obtain a higher conversion. Generally, it is preferred to reflux ethylene chlorhydrin with the copper or silver for somewhat more than 24 hours and preferably for a period of 40–50 hours, although an even longer period, e. g. up to 60 or 70 hours, may be used if desired. A somewhat increased conversion for a given heating period may be obtained by adopting a cascade operation. This may be put into practice by heating the chlorhydrin or other organic compound used as starting material with the copper or silver for a short period, e. g. 1–5 hours, and then decanting the liquid on to fresh copper or silver and using the copper or silver remaining from the first operation for the treatment of fresh chlorhydrin, this operation being repeated a number of times so that eventually a number of vessels are in use in which fresh copper or silver is used for the product which has undergone reaction for the longest period, while fresh chlorhydrin is subjected to treatment with the copper or silver nearest exhaustion, i. e. largely converted into copper or silver halide. Such an operation may be carried out automatically is desired by a suitable arrangement of overflows, so that the chlorhydrin gradually travels through the successive vessels in a continuous manner, while from time to time a vessel containing exhausted copper or silver is removed and a vessel containing fresh copper or silver is replaced at the other end of the line.

Theoretically one atom of copper or two atoms of silver are required to combine with each two atoms of halogen, but in practice it is found desirable to use an excess of the metal, at least twice the stoichiometrical amount being used and preferably a quantity equal to 4 or 5 times or even more, e. g. up to 6 or 7 times the stoichiometrical amount.

It has been found advantageous to have present in the reactants a quantity of a strong base, e. g. a caustic alkali, especially when moisture is present. Caustic soda is very effective and even small quantities of this substance, e. g. 4 or 5% on the weight of the reactants, cause a marked improvement in the conversion, while even larger quantites, e. g. up to 10 or 20%, produce even better results. The caustic alkali can be added solid or as a concentrated aqueous solution to the reactants. Organic bases and more particularly primary bases, e. g. mono-methylamine, produce a similar effect and rather smaller quantities of mono-methylamine produce effects quite as marked as much larger quantities of caustic soda. For example, 5% on the weight of the reactants of mono-methylamine is very effective in practice.

The following examples illustrate the invention:

Example 1

Production of finely divided and chemically reactive copper:

100 parts by weight of crystalline copper sulphate ($CuSO_4.5H_2O$) are dissolved in 3,000 parts by weight of water and concentrated aqueous ammonia (0.880 sp. gr.) added until the precipitate formed just redissolves. Glacial acetic acid is added until the mixture becomes acid and sulphur dioxide is then passed into the mixture. The blue solution becomes dark green and a fine green precipitate is formed which changes colour, passing from yellowish brown to a final buff colour. The super-natant liquor is decanted from this buff precipitate which is then washed thoroughly with water whilst avoiding unnecessary exposure to air and partially dried by filtration with suction.

Example 2

Preparation of finely divided and chemically reactive silver:

100 parts by weight of crystalline silver nitrate are dissolved in 2,000 grams of water and concentrated ammonia (0.880 sp. gr.) is added until the precipitate first formed redissolves. Glacial acetic acid is then added until the mixture is acid when a white precipitate of silver acetate is obtained. Sulphur dioxide is passed through this suspension of silver acetate until the latter is reduced to silver, after which the silver is separated and washed as described in connection with the production of copper in Example 1.

Example 3

Production of tetramethylene glycol from ethylene chlorhydrin:

To ethylene chlorhydrin there is added a quantity of the copper prepared according to Example 1, equal to 5 times the stoichiometrical equivalent of the chlorine present. 5% of mono-methylamine on the weight of the reactants is then added, and the mixture is heated to boiling under reflux. After refluxing for 48 hours, the product is fractionated and the fraction boiling above 180° C. containing substantially the whole of the tetramethylene glycol formed, being collected separately. This fraction is then redistilled to obtain the tetramethylene glycol in pure form.

Having described my invention, what I desire to secure by Letters Patent is:

1. Process for the production of a polyhydric alcohol, which comprises subjecting a hydroxyl-group-containing halogen derivative of a polyhydric alcohol containing fewer carbon atoms to the action of heat in presence of a metal selected from the group consisting of copper and silver said metal being prepared in a finely divided and chemically reactive form, by reduction with sulphur dioxide of a compound of the metal dispersed in an aqueous medium so as to eliminate halogen from said compound to produce a polyhydric alcohol of higher molecular weight.

2. Process for the production of a glycol, which comprises subjecting a halohydrin of a glycol containing fewer carbon atoms to the action of heat in presence of a metal selected from the group consisting of copper and silver said metal being prepared in a finely divided and chemically reactive form, by reduction with sulphur dioxide of a compound of the metal dispersed in an aqueous medium so as to eliminate halogen from said compound to produce a glycol of higher molecular weight.

3. Process for the production of tetramethylene glycol, which comprises subjecting an ethylene glycol halohydrin to the action of a metal selected from the group consisting of copper and silver said metal being prepared in a finely divided and chemically reactive form by reduction with sulphur dioxide of a compound of the metal dispersed in an aqueous medium so as to eliminate halogen from said compound to produce tetramethylene glycol.

4. Process for the production of tetramethylene glycol, which comprises subjecting ethylene glycol chlorhydrin to the action of a metal selected from the group consisting of copper and silver said metal being prepared in a finely divided and chemically reactive form by reduction with sulphur dioxide of a compound of the metal dispersed in an aqueous medium so as to eliminate chlorine from said compound to produce tetramethylene glycol.

5. Process for the production of a glycol, which comprises subjecting a holahydrin of a glycol containing fewer carbon atoms to the action of heat in presence of a metal selected from the group consisting of copper and silver in a finely divided and chemically reactive form prepared by acidification of an ammoniacal solution of a salt of the metal with a lower fatty acid, followed by reduction with sulphur dioxide, so as to eliminate halogen from said compound to produce a glycol of higher molecular weight.

6. Process for the production of a polyhydric alcohol, which comprises subjecting a hydroxyl-group-containing halogen derivative of a polyhydric alcohol containing fewer carbon atoms to the action of heat under reflux in presence of a metal selected from the group consisting of copper and silver said metal being prepared in a finely divided and chemically reactive form, by reduction with sulphur dioxide of a compound of the metal dispersed in an aqueous medium so as to eliminate halogen from said compound to produce a polyhydric alcohol of higher molecular weight.

7. Process for the production of a glycol, which comprises subjecting a halohydrin of a glycol containing fewer carbon atoms to the action of heat in presence of a metal selected from the group consisting of copper and silver said metal being prepared in a finely divided and chemically reactive form by reduction with sulphur dioxide of a compound of the metal dispersed in an aqueous medium in the presence of a strong base, so as to eliminate halogen from said compound to produce a glycol of higher molecular weight.

HENRY DREYFUS.